(12) United States Patent
Partington et al.

(10) Patent No.: US 8,480,935 B2
(45) Date of Patent: Jul. 9, 2013

(54) FIBRE-REINFORCED COMPOSITE MATERIAL AND MANUFACTURE THEREOF

(75) Inventors: Nicholas Duncan Partington, Cowes (GB); Yves Jean Francois Didier, Cowes (GB)

(73) Assignee: Gurit (UK) Ltd., Newport (GB)

( * ) Notice: Subject to any disclaimer, the term of this patent is extended or adjusted under 35 U.S.C. 154(b) by 0 days.

(21) Appl. No.: 13/302,036

(22) Filed: Nov. 22, 2011

(65) Prior Publication Data

US 2012/0064333 A1 Mar. 15, 2012

Related U.S. Application Data

(62) Division of application No. 12/863,813, filed as application No. PCT/GB2008/004153 on Dec. 15, 2008, now Pat. No. 8,071,204.

(30) Foreign Application Priority Data

Jan. 22, 2008 (GB) .................................. 0801155.3

(51) Int. Cl.
*B29C 67/00* (2006.01)

(52) U.S. Cl.
USPC .......................................... 264/136; 264/137

(58) Field of Classification Search
USPC ................................................. 264/136, 137
See application file for complete search history.

(56) References Cited

U.S. PATENT DOCUMENTS

| | | | | |
|---|---|---|---|---|
| 2,131,043 A | * | 9/1938 | Ochs et al. | 264/131 |
| 3,881,978 A | * | 5/1975 | Livingston et al. | 156/247 |
| 4,329,194 A | * | 5/1982 | Green et al. | 156/179 |
| 6,861,131 B2 | | 3/2005 | Evans | |

FOREIGN PATENT DOCUMENTS

| | | |
|---|---|---|
| EP | 0124403 A1 | 3/1984 |
| EP | 0662492 A1 | 12/1994 |
| WO | WO 02/46276 A2 | 6/2002 |
| WO | WO 2006/034830 A1 | 4/2006 |

OTHER PUBLICATIONS

Mar. 5, 2009 International Search Report and Written Opinion in related PCT/GB2008/004153.
May 23, 2008 GB Search Report under Section 17(5) in related Application No. GB0801155.3.

* cited by examiner

*Primary Examiner* — Joseph S Del Sole
*Assistant Examiner* — David N Brown, II
(74) *Attorney, Agent, or Firm* — Novak Druce Connolly Bove & Quigg LLP

(57) ABSTRACT

Prepreg for manufacturing a fiber-reinforced composite material, the prepreg comprising a layer of dry fibers and a layer of resin material adhered to a surface of the layer of dry fibers, the resin material having a plurality of particles dispersed therein, the particles have an average particle size that is larger than the average fiber separation of the layer of dry fibers.

20 Claims, 2 Drawing Sheets

FIBRE-REINFORCED COMPOSITE MATERIAL AND MANUFACTURE THEREOF

FIELD OF THE INVENTION

The present invention relates to a fibre-reinforced composite material, to a method of manufacturing a fibre-reinforced composite material and to a prepreg for manufacturing a fibre-reinforced composite material.

BACKGROUND

It is known to provide structural fibre-reinforced hot-melt epoxy composite materials. Inorganic fillers are commonly added to epoxy resin systems to modify properties, for example to modify the thermal and mechanical performance, to impart fire-retardant properties, to customise the rheological and handling properties, to increase ultraviolet (UV) radiation stability, and to provide weathering resistance. Traditionally, these fillers are dispersed homogeneously throughout the resin matrix. Many improvements in properties do not require such homogeneous dispersion and so this may result in a material which is thus either over-engineered for the application or, conversely, reduced in one or more other properties.

EP-A-0124403 discloses a collar comprising a central body of resin containing inert mineral fillers and outer layers of fibre reinforcement, the outer fibre layers preventing the passage of the mineral fillers outwardly from the central body.

WO-A-02/046276 discloses hybrid composite articles in which polymer particles are distributed evenly throughout a strand and substantially fill the gaps between individual fibres. The polymer particles are significantly smaller than the fibre diameter so that there is a homogeneous dispersion of the polymer particles throughout the resin matrix.

Epoxy resin matrices are inherently not fire-retardant. It is known that a hot-melt epoxy resin system can, however, achieve increased fire-retardant properties through the incorporation of inorganic fillers. Fire standards vary significantly depending on the application and country in which a fire-retardant material is to be used. However, in general, several common properties are measured as part of a fire-standard. These include: heat release, smoke density and toxicity, burn rate and time to extinguish.

SUMMARY OF THE INVENTION

Although the fire-retardant performance increases with increasing concentration of fire-retardant fillers, however the thermal and mechanical properties are in general reduced with increasing filler concentration in a cured fibre-reinforced laminate. This reduction in performance may be explained due to a reduction in matrix cross-link density. Therefore, for known structural fire-retardant applications, it was necessary to have a suitable compromise of high fire-retardant properties and high thermal-mechanical properties.

There is a need in the art for a fibre-reinforced composite containing a particulate filler to impart the desired filler properties, and a method of manufacture thereof, which can provide the composite with the required combination of properties, both from the filler and from the fibre and resin matrix components, in a cost-effective, efficient and reliable manner.

The present invention aims at least partially to meet this need.

The present invention accordingly provides a fibre-reinforced composite material comprising a layer of fibres within in a resin matrix, and a plurality of particles dispersed within the resin matrix, wherein the particles are heterogeneously dispersed within the resin matrix and a first region of the resin matrix disposed at a surface of the layer of fibres has a higher concentration of particles than a second region of the resin matrix disposed within the layer of fibres.

Optionally, the particles comprise a fire retardant.

Preferably, the volume fraction of the fibres in the prepreg is from 40 to 60%. More preferably, the volume fraction of the fibres in the prepreg is from 45 to 55%.

Preferably, the fibres have a diameter of from 5 to 25 microns and a majority of the particles have a size of from 1 to 10 microns.

In one embodiment, the layer of resin material partially impregnates the layer of dry fibres. In another embodiment, the layer of dry fibres and the layer of resin material are adhered together by the inherent tack of the resin material.

Preferably, the particles have a size that is greater than the parameter s, which is a separation distance of the fibres, as calculated using the following equation $$s = 2\left[\left(\frac{\pi}{2\sqrt{3V_f}}\right)^{\frac{1}{2}} - 1\right]r$$

where $V_f$ is the volume fraction of the fibres with respect to the total volume of the fibres and the resin matrix and r is the radius of the fibres.

The present invention further provides a method of manufacturing a fibre-reinforced composite material, the method including the steps of: (a) providing a layer of dry fibres; (b) providing a resin having a plurality of particles dispersed therein; (c) forming a layer of the resin on a surface of the layer of fibres; and (d) flowing the resin into the layer of fibres to form a resin matrix around the layer of fibres, the layer of fibres filtering the particles dispersed in the resin to form a heterogeneous dispersion of the particles within the resin matrix.

The present invention yet further provides a prepreg for manufacturing a fibre-reinforced composite material, the prepreg comprising a layer of dry fibres and a layer of resin material adhered to a surface of the layer of dry fibres, the resin material having a plurality of particles dispersed therein, the particles have an average particle size that is larger than the average fibre separation of the layer of dry fibres.

The present invention still further provides a method of manufacturing a fibre-reinforced composite material, the method including the steps of: (a) providing a prepreg according to the present invention; and (b) flowing the resin into the layer of dry fibres to form a resin matrix around the layer of fibres, the layer of fibres filtering the particles dispersed in the resin to form a heterogeneous dispersion of the particles within the resin matrix.

The preferred embodiments of the present invention can control the amount and dispersion of particulate fillers required to provide the composite with the required filler properties, without a significant reduction in the properties of fibre and resin matrix components, in a cost-effective, efficient and reliable manner.

The particles may be filler particles for providing the composite with particular properties. For example, the filler particles may be an inorganic material, for example a fire retardant such as zinc borate or alumina trihydrate. Alternatively, the particles may provide the composite with toughening properties, and/or electroconductive properties, for example.

The preferred embodiments of the present invention in particular can employ positive physical particle filtration effects which occur during a cure of the prepreg, for forming fibre-reinforced composites, in which a layer of structural polymer resin is adjacent and adhered by its inherent tack to, and optionally may be partially impregnated into, a layer of dry fibre reinforcement. Such prepregs are manufactured by the applicant and sold under the registered trade mark SPRINT®. The layer of structural polymer resin of such prepregs has been modified by a pre-dispersion of particulate filler, e.g. of inorganic filler materials, within the resin matrix. This allows controlled deployment of the filler particles at optimal regions of the cured composite laminate, resulting in a material with highly tailored and specific properties.

The preferred embodiments of the present invention relate in particular to the field of structural fibre-reinforced hot-melt epoxy composite materials. As stated above, inorganic fillers are commonly added to epoxy resin systems to modify properties including; thermal and mechanical performance, impart fire-retardant properties, customise rheological and handling properties, increase UV stability and weathering resistance. The present invention is at least partly predicated on the finding that by providing, in the prepreg, a size relationship between, on the one hand, the particulate size of filer in the resin layer and, on the other hand, the separation between adjacent fibres in an adjacent dry fibre reinforcement, the dry fibre reinforcement can provide a positive filtering effect to prevent or restrict the particulate filler from entering the dry fibre reinforcement during resin wet-out of the dry fibre reinforcement and subsequent resin curing. This permits the specific placement of particulate filler materials at only (a) surface regions of the cured composite component and (b) inter-ply regions of the cured composite component when plural prepregs are provided as a stack to form multiple-ply fibre-reinforced composite.

The preferred embodiments of the present invention result in several advantages; firstly, the amount of inorganic fillers used in the resin matrix may be significantly reduced because the particulate filler materials are not required to be homogeneously distributed throughout the entire composite laminate, the expedient employed in the state of the art as discussed above. This may offer significant cost reductions in the case where the filler cost exceeds that of the structural resin base into which the particulate filler material is incorporated. It also allows high concentrations of fillers to be deployed at inter-ply regions which previously may have been unachievable due to processing and/or manufacturing constraints. In contrast, in known processes in which the particulate filler materials are required to be homogeneously distributed throughout the entire composite laminate, when a high concentration of filler particles is used the effective total surface area of filler material may be high, and this in turn would require a high concentration of binder material to wet the filler surface in order to realise a material with suitable rheology to facilitate processing and handling.

The preferred embodiments of the present invention have particular utility in the manufacture of advanced composite laminates that have high strength and stiffness, yet also have a high toughness. In a known composite laminate, the weakest region is often the interlamina area, between adjacent laminae, where there tends to be a reduced fibre volume ratio in comparison with the intralamina regions, within the laminae themselves, as a result of the nature of known composite laminating techniques. The present invention can allow the controlled placement of toughening additives directly at such weaker areas. In general, toughening additives compromise material stiffness; hence by only toughening the interlamina regions, this can result in a composite laminate with high toughness in the interlamina region, and yet high stiffness in the intralamina regions is not compromised—the net effect is a composite laminate with both high toughness and high stiffness.

The preferred embodiments of the present invention also have particular utility in the manufacture of composite laminates with high environmental stability. During environmental exposure a polymeric material may degrade both aesthetically (e.g. colour change, loss of gloss, scratching, etc) and/or physically (e.g. water ingress, UV degradation, physical wear, etc). A commonly known approach to reduce such degradation is to add a protective coating to the materials surface. Such coatings may be filled with select fillers to increase properties such as UV stability and wear and water resistance. The present invention can permit such fillers to be added directly to the structural resin matrix and then, during wet-out and cure, be deployed at the surface of the component to impart environmental stability. This provides the required surface properties to the composite laminate without the need for additional surface coatings, which can result in savings in both cost and time.

The preferred embodiments of the present invention also have particular utility in the manufacture of composite laminates that have high mechanical performance in combination with increased fire-retardant properties. Polymeric materials such as epoxy resins are often intrinsically combustible. Inorganic fire-retardant fillers may be added to these materials in order to impart fire-retardant properties. However, in order to achieve sufficient fire-retardancy, it is often necessary to use high concentrations of fire-retardant fillers which may in turn, reduce other properties such as mechanical and thermal performance. The present invention can allow the placement of concentrated layers of fire-retardant fillers at the component surface, and at inter-laminar interfaces for multi-ply laminates, to increase fire-retardant properties, but which also minimises the reduction in other properties because the total filler concentration in the laminate is low due to the heterogeneous distribution of the fire-retardant filler in the composite laminate.

The preferred embodiments of the present invention also have particular utility in the manufacture of high-performance composite materials with low surface resistivity. Many applications require materials which are electrically conductive (e.g. fuel tanks, lightening conductors, etc). Polymeric materials commonly exhibit a high electrical resistivity; they may however be modified with conductive fillers to reduce their electrical resistivity. The present invention can permit a low net concentration of electrically conductive fillers to be added to the composite laminate which can result in a low electrical resistivity surface layer.

The preferred embodiments of the present invention can provide a number of technical advantages and benefits as compared to the manufacture of known composite laminates. In particular, a lower overall content of filler may be required to achieve a given performance increase. This is because the filtering of the filler by the fibrous material so as to remain on the surface thereof provides a filler-rich surface providing the require properties, with a relatively low filler concentration within the body of the fibrous material. This can facilitate a property improvement without sacrificing other properties, for example to increase fire retardancy without reducing mechanical performance.

By distribution of the filler preferentially on the surface of the fibrous layer, this can allow higher filler concentrations to be used than would be feasible with traditional filled resin systems, in particular epoxy resin systems. The multi-laminate embodiments can provide easy control the regional placement of the filler particles within a laminate configuration to allow specific optimisation of the laminate performance.

BRIEF DESCRIPTION OF THE DRAWINGS

Embodiments of the present invention will now be described by way of example only with reference to the accompanying drawings, in which.

DETAILED DESCRIPTION

Figure 1:
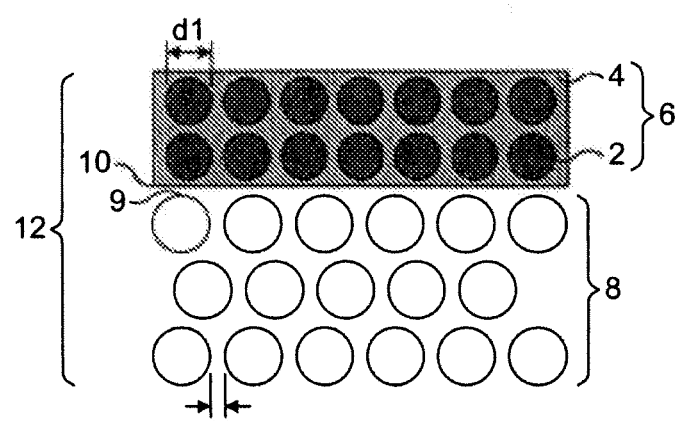
FIG. 1 is a schematic drawing of a single-sided prepreg to form a fibre-reinforced composite in accordance with a first embodiment of the present invention, the prepreg comprising a layer of dry fibre reinforcement and a layer of resin containing a dispersion of filler particles.

Referring to FIG. 1 which illustrates a preferred embodiment of the present invention, inorganic filler particles 2, for example of a fire-retardant, are pre-dispersed into a semi-solid epoxy-functional base resin 4 using high-speed mechanical dispersion equipment known to those skilled in the art. The filler particles 2 may comprise a plurality of materials providing different properties, for example a fire-retardant filler and a toughening filler. In addition, anti-settling additives such as fumed silicon dioxide may be added to ensure that a homogeneous dispersion is maintained throughout any conventional storage period for the material prior to use.

The base resin 4 is then blended with a latent catalyst and extruded into a film 6 using hot-melt filming technology known to those skilled in the art. A surface 9 of a dry fibre reinforcement 8 which may be made of glass, carbon, aramid or similar is then applied to one surface 10 of the pre-catalysed resin film 6 using light pressure to form a resin/fibre prepreg 12 with resin on one side and dry fibres on the opposite side. This may be called a single-sided prepreg, with the resin layer on one side of the dry fibre layer.

The dry fibre reinforcement 8 may have any desired configuration of fibres, and may have one or more layers of fibres at the same or different orientation. Each layer may comprise unidirectional fibres, or a woven web or cloth.

In the prepreg 12, the amount of resin material in the film 6 is matched to amount of the dry fibre reinforcement 8 so that during subsequent wet-out of the dry fibre reinforcement 8 by the resin prior to curing of the resin to make the composite material, the resin fully wets out the entire dry fibre reinforcement 8. The resin film 6 may partially impregnate the dry fibre reinforcement 8 as a result of the application of pressure when the dry fibre reinforcement 8 is applied to the pre-catalysed resin film 6. Alternatively, there may be substantially no impregnation of the dry fibre reinforcement 8 by the resin film 6 and the two layers of the prepreg 12 may be adhered together by the inherent tack of the surface of the resin film 6.

Figure 2:
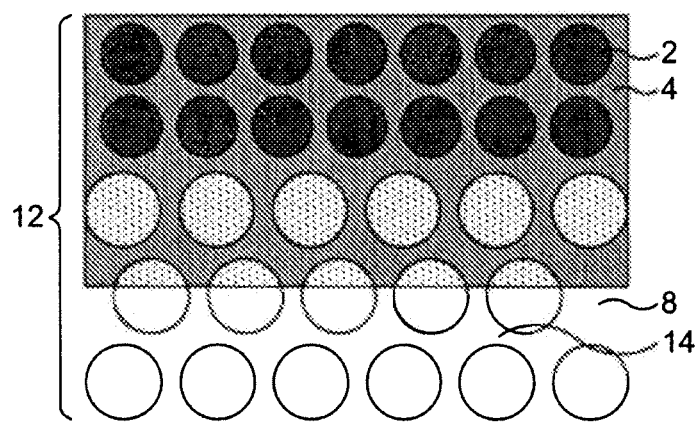
FIG. 2 is a schematic drawing of the prepreg of FIG. 1 after resin flow into part of the layer of dry fibre reinforcement during an initial stage of resin wet out and curing to form a fibre-reinforced composite.
Figure 3:
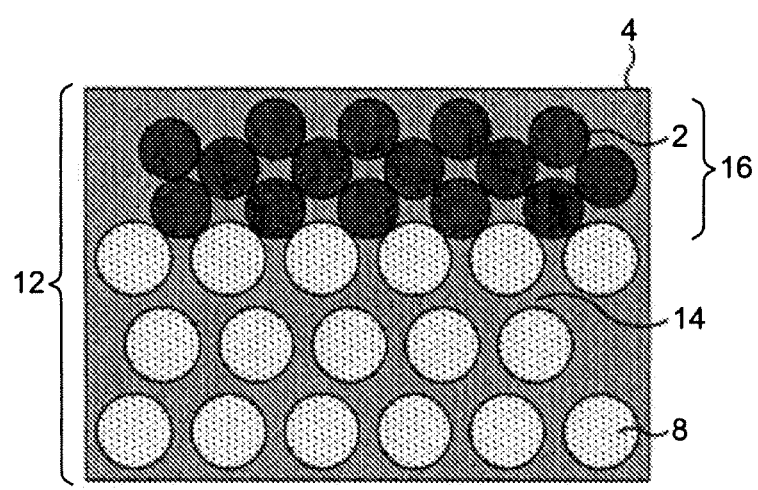
FIG. 3 is a schematic drawing of the fibre-reinforced composite produced from the prepreg of FIG. 1 after complete resin flow into the layer of dry fibre reinforcement in a resin wet out stage and subsequent resin curing.

FIGS. 2 and 3 show schematic diagrams of the physical filtering mechanism of filler particles by the fibres, during the wet-out of the dry fibres by the resin, in the initial stage of the curing step prior to final curing of the resin. FIG. 2 shows the resin partly wetting-out the dry fibres, and FIG. 3 shows the resin fully wetting-out the dry fibres. The curing step may be carried out using known processes, such as vacuum bag or autoclave moulding techniques.

FIG. 2 shows a single ply of single-sided prepreg material 12 whereby the filler particles 2 are predispersed in the catalysed resin film 4 which is adhered to the dry fibre reinforcement layer 8.

Referring to FIGS. 2 and 3, during the resin curing step, the prepreg 12 is heated in order to reduce the viscosity of the base resin 4 sufficiently to allow the resin 4 to flow into regions 14 of the dry fibre reinforcement 8 between the fibres themselves. As known in the art, the surface energy of the resin matrix is such that sufficient wetting and spreading of the fibre surface occurs.

The inorganic filler particles 2 have a particle size, for example by being milled, so that the minimum particle diameter, d1 in FIG. 1, is greater than the maximum inter-fibre distance d2. As known to those skilled in the art, the inter-fibre distance d2 varies depending on the fibre reinforcement. The selection of reinforcement type and configuration is dependent on the application for which the material is being used. Therefore, it is necessary to tailor the filler particle size distribution to the dry fibre reinforcement being used for a particular application.

When the resin matrix 4 is heated to allow it to become sufficiently mobile to flow and wet the fibre reinforcement, the filler particles 2 are then physically filtered (if d1>>d2) by the reinforcement layer 8 and cannot penetrate the inter-fibre regions 14. This results in a macroscopic layer 16 of filler-reinforced resin matrix at the surface 9 of the fibre reinforcement layer 8 as shown in FIG. 3.

FIG. 3 depicts partial resin wet-out during the initial stage of cure, whereby the catalysed resin film 4 flows into the fibre reinforcement layer 8 and wets and spreads over the fibre surfaces. The filler particles 2 are physically prevented from penetrating the fibre layer because d1>d2.

When determining the desired files particle size, i.e. the parameter d2, for use with any particular fibre reinforcement layer 8, it is important to consider what effects any handling and processing of the dry fibre material may have on fibre spacing parameter d3, and consequently the maximum value of d2 to achieve the desired filtering effect. For example, if the dry fibre material is applied to tooling which has acute radii, then some fibre spread may occur which could increase the effective value of d2. If this is not taken into account, then physical filtration of filler particles by the fibres may not occur uniformly throughout the cured laminate.

If solid catalysts are used in the resin film 4 then their maximum particle diameter should be significantly less than the minimum inter-fibre distance d3 to ensure that catalyst filtration does not occur. This could otherwise result in a heterogeneously cured material, because of heterogeneous catalyst distribution, and hence could lead to a reduction in properties such as mechanical performance, and thermal, solvent and corrosion resistance.

It is well known to those skilled in the art of composite materials that in a fibre-reinforced resin composite, for a given volume fraction of the fibres within the resin matrix there is a particular fibre separation for a given fibre radius to achieve the preferred mechanical properties. Therefore for a given volume fraction and fibre radius, the theoretical fibre separation may be estimated. For example, at a volume fraction for the fibres of 55% and a fibre diameter of 6 microns, the theoretical separation distance between adjacent fibres is 0.63 microns.

In Hull, (Hull, D. An Introduction to Composite Materials, 1992, Cambridge University Press (0 521 28392 2)) it is disclosed that the ideal arrangement for a given fibre volume fraction, given by the parameter $V_f$, is related to the fibre radius, r. The separation of the fibres, for an ideal hexagonal close packing of the fibres, will be calculated by Equation 1, where s is the separation of the fibres, $V_f$ is the volume fraction of the fibres with respect to the total volume of the fibres and the resin matrix and r is the radius of the fibre filaments.

$$s = 2\left[\left(\frac{\pi}{2\sqrt{3V_f}}\right)^{\frac{1}{2}} - 1\right]r. \quad \text{Equation 1}$$

In accordance with one preferred aspect of the present invention, the particles have a size that is greater than the parameter s as calculated using Equation 1 for a particular volume faction of the fibres with respect to the total volume of the fibres and the resin matrix and r is the radius of the fibres.

In accordance with the preferred embodiments of the present invention, the fibres typically have a diameter of from 5 to 25 microns, with glass fibre typically having a diameter of from 7 to 21 microns, and carbon fibre typically having a diameter of about 7 microns. Preferably, the fibres have a diameter of from 5 to 25 microns and a majority of the particles have a size of from 1 to 10 microns. For fire-retardant composites in accordance with the preferred embodiments of the present invention, the fibres typically comprise glass or basalt fibre, and typically with a diameter of from 10 to 15 microns. In accordance with the preferred embodiments of the present invention, typically the volume fraction of the fibres in the resin matrix is from 40 to 60%, more typically from 45 to 55%. This enables the laminate to be processed during curing under vacuum conditions.

Correspondingly, the particle size can vary depending upon the fibre diameter and the volume fraction. Some known fire retardants have a particle size distribution, for example the fire retardants sold by Albermarl Corporation under the trade mark Martinal, and under the product names OL-111/LE, OL-107/LE and OL-104/LE, have a manufacturer specified particle size distribution. Other fire retardants have a manufacturer specified median particle size, for example the fire retardant supplied by Borax Europe Limited under the trade mark Firebrake zb (which has a standard grade and a fine grade).

Accordingly, it is necessary to ensure that a majority of the particles in that distribution have a diameter greater than the fibre separation. For the example above, at a volume fraction for the fibres of 55% and a fibre diameter of 6 microns, for which the theoretical separation distance between adjacent fibres is 0.63 microns, for all of the OL-111/LE, OL-107/LE and OL-104/LE fire retardants at least 90% of the particles have a diameter greater than this threshold distance, and for the Firebrake zb both the standard and fine grades have a median particle diameter greater than this threshold distance.

FIG. 3 shows the fully wet-out and cured single ply of single-sided prepreg material 12. The resin matrix 4 has fully impregnated both the fibre reinforcement 8 and the filler particles 2. Due to the filtering properties of the fibre reinforcement layer, there is a concentrated region of filler particles 2 at the surface of the fibre reinforcement ply.

Once the fibre reinforcement 8 has been sufficiently impregnated by the base resin 4, the temperature of the component is increased to that of the activation energy of the latent catalysts present within the resin matrix. Suitable catalysts and accelerators for the cure of epoxide resins include dicyandiamide, diamino-diphenylsulphones, imidazoles, halogenated boron complexes, acid anhydrides, and urones. This results in the catalysis of the homopolymerisation of the bi-functional epoxide resin to form a three-dimensional cross-linked thermoset material.

The resin curing step forms the final fibre-reinforced composite material.

The configuration of a single-sided prepreg material 12 as shown in FIG. 1 results in a cured component which has a concentrated filler layer 16 on one external surface of the cured component. This may be advantageous where a surface coating of filler material is required, for example in fire-retardant or environmentally stable components.

However, in many preferred embodiments of the present invention, the fibre-reinforced composite material comprises a plurality of fibre reinforcement layers. When the single-sided prepreg comprising the resin layer and the dry fibre layer is used as the outer ply, or both outer plies, of a multiple-ply stack, then the resultant fibre-reinforced composite material has one or both surfaces rich in filler.

In many embodiments however, a stack of single-sided prepregs is employed, and the single-sided prepreg comprising the resin layer and the dry fibre layer is used not only as the outer ply, or both outer plies, but also as one or more inner plies. This provides a fibre-reinforced composite material which additionally has filler-rich interlamina regions between adjacent fibre reinforcement layers.

Figure 4:
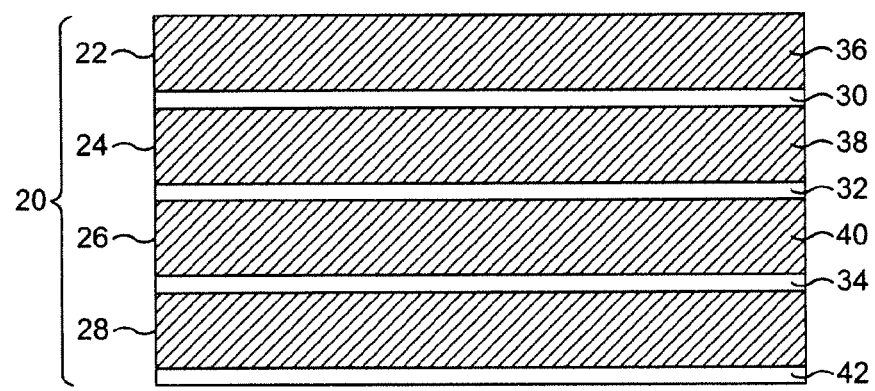
FIG. 4 is a schematic drawing of a fibre-reinforced composite in accordance with a second embodiment of the present invention, the composite having been produced from a stack of the prepregs of FIG. 1.

FIG. 4 shows a schematic cross-section of a cured fibre reinforced laminate 20 consisting of four plies 22, 24, 26, 28 of fibre reinforced resin. Layers 30, 32 34 of filtered filler particles are concentrated at the respective inter-ply regions whereas no filler particles are present in the intra-ply regions 36, 38, 40 which are dominated by fibre-reinforced unfilled cross-linked epoxy resin. A surface layer 42 of filler-rich resin is provided at one surface of the laminate 20.

The present invention has particular application to the manufacture of a fibre-reinforced composite material that has fire retardant properties by the provision of a fire-retardant filler. The fire-retardant filler can be selectively located to provide a high-concentration of fire-retardant filler at the interlamina and surface regions where fire-retardancy is required to be highest (this is especially important at the surface which is likely to be exposed to the ignition/heat sources). However, the overall filler concentration within the structural fibre-reinforced resin plies is kept low enough to limit degradation in the mechanical and thermal properties of the fibre-reinforced composite material.

The following non-limiting Example further illustrates the present invention.

Example 1

Following laboratory-based formulation and development work, and preliminary fire tests, large scale laminates were manufactured embodying the present invention. In these laminates, the volume fraction Vf was 46.6% and the fibre diameter was 6 microns. The filler used in the example was a fire retardant sold by Albermarl Corporation under the trade mark Martinal, and under the product names OL-104/LE, and the filler particle size was estimated to be approximately 3.3 microns.

The epoxy resin used was the resin sold by Gurit (UK) Limited under the trade name ST70FR including the fire-retardant filler particles identified above. These laminate samples were tested for thermal and mechanical performance (glass transition temperature and inter-lamina shear strength respectively), and the results compared to a control sample of ST70 which employed the same epoxy base resin system without fire-retardant filler. Panels were also tested in accordance to the fire test of British Standard BS476 Part 6 and 7.

BS 476-6: Method of Test for Fire Propagation for Products

This test provides a comparative measurement of a material's contribution to fire-growth, primarily for internal wall and ceiling linings. Three to five specimens are tested, with dimensions 225 mm×225 mm. The specimen is held vertically and put into a gas fired flame, with the increase in temperature of the air in the test chamber and of the specimen measured. These are used to calculate a fire propagation index, with thresholds on the index determining if the material qualifies for use.

BS 476-7: Method of Test to Determine the Classification of the Surface Spread of Flame of Products This test measures the lateral rate of spread of flames along a vertical specimen. The material is given a rating of Class 1-4 according to its performance. Six to nine specimens are tested, with dimensions 865 mm×270 mm. The relevant surface of the specimen is exposed to a radiant panel. A pilot flame is applied to one end of the specimen for 1 minute after the start of the test, and measurements of the distance and time of flame spread are taken at pre-determined intervals. The test is terminated when the flame propagates 825 mm along the specimen from the end at which the flame was applied, or after 10 minutes, whichever occurs first. Materials are classified according to the performance criteria detailed in Table 1.

TABLE 1

Classification Criteria for BS 476-7

| | Spread of flame at 1.5 min | | Final spread of flame | |
|---|---|---|---|---|
| Classification | Limit (mm) | Limit for one specimen (mm) | Limit (mm) | Limit for one specimen (mm) |
| Class 1 | 165 | 165 + 25 | 165 | 165 + 25 |
| Class 2 | 215 | 215 + 25 | 455 | 455 + 25 |
| Class 3 | 265 | 265 + 25 | 710 | 710 + 25 |
| Class 4 | Exceeding the limits for Class 3 | | | |

Figure 5:
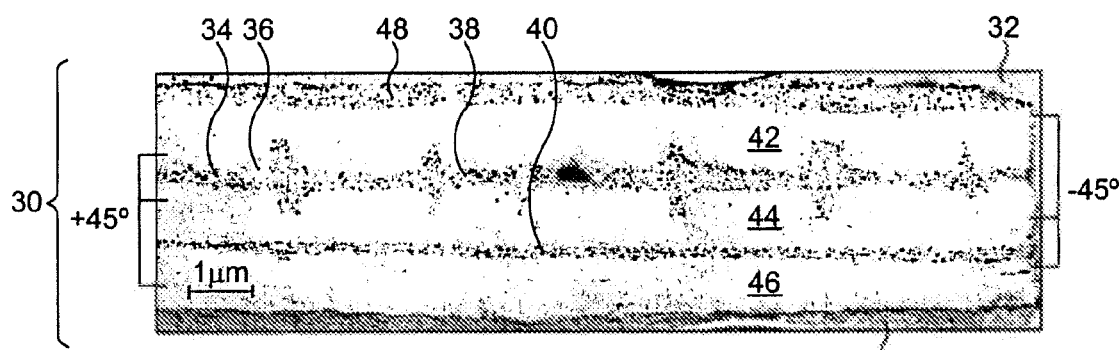
FIG. 5 is a photomicrograph of a fibre-reinforced composite in accordance with a third embodiment of the present invention.

FIG. 5 shows a cross-section of a cured laminate section 30 (which is supported for photographic analysis between opposed layers of potting compound 32) of a sample composite material produced in accordance with the invention. The filtered fire-retardant filler particles 34 within a resin matrix 36 are present in interlamina layers 38, 40 between adjacent plies 42, 44, 46 of fibre-reinforced resin and in a surface layer 48. The plies 42, 44, 46 of fibre-reinforced resin have an intra-ply region that is without the fire-retardant filler particles 34. In this laminate, each ply consists of a biaxial material, comprising a first layer of +45 degree uniaxial fibres and a second layer of −45 degree uniaxial fibres. In the Figure the +45 degree fibres are perpendicular to the cross section.

The resin containing the filler particles 34 has penetrated gaps between the reinforcement layers and the fibre tows, to form upwardly and downwardly directed ridges; however the filtering effect of the fibres is clearly shown where the fibre tows are present.

This product passed the requisite fire tests. The filler-rich layers provided a high degree of fire protection and the filler-poor areas, which are rich in resin and so more likely to combust preferentially, were protected by the filler-rich layers. In addition, the mechanical properties were tested and the results showed a negligible reduction in mechanical properties compared to unfilled control system.

This invention has application by composite material manufacturers for any requirement where fillers need to be placed at the surface and/or interlamina regions of a fibre-reinforced composite.

The invention claimed is:

1. A method of manufacturing a fibre-reinforced composite material, the method including the steps of:
   (a) providing at least two layers of dry fibres;
   (b) providing a resin having a plurality of particles dispersed therein;
   (c) forming a stack of adjacent layers of fibre with a layer of the resin on a surface of each layer of fibres; and
   (d) flowing the resin into each layer of fibres to form a resin matrix around each layer of fibres, each layer of fibres filtering the particles dispersed in the resin to form a heterogeneous dispersion of the particles within the resin matrix, wherein the resin matrix comprises a first region disposed at a surface of each layer of fibres and between adjacent fibre layers, which first region has a higher concentration of particles than a second region of the resin matrix disposed within the respective layer of fibres.

2. A method according to claim 1 wherein the particles comprise fire retardant.

3. A method according to claim 1 wherein the first region comprises a continuous layer extending over the surface of the layer of fibres.

4. A method according to claim 1 wherein the fibres in the layer have an average fibre separation and the particles have an average particle size that is larger than the average fibre separation of the layer of fibres.

5. A method according to claim 1 wherein the volume fraction of the fibres in the resin matrix is from 40 to 60%.

6. A method according to claim 5 wherein the volume fraction of the fibres in the resin matrix is from 45 to 55%.

7. A method according to claim 1 wherein the fibres have a diameter of from 5 to 25 microns and a majority of the particles have a size of from 1 to 10 microns.

8. A method according to claim 1 wherein step (c) of forming a layer of the resin on a surface of the layer of fibres forms a prepreg, and the step (d) of flowing the resin into the layer of fibres to form a resin matrix around the layer of fibres is carried out in an initial phase of a resin curing process to form a fibre-reinforced composite material.

9. A method according to claim 8 wherein in the prepreg the layer of resin partially impregnates the layer of dry fibres.

10. A method according to claim 8 wherein in the prepreg the layer of dry fibres and the layer of resin are adhered together by the inherent tack of the resin.

11. A method according to claim 1 wherein the particles have a size that is greater than the parameter s, which is a separation distance of the fibres, as calculated using the following equation $$s = 2\left[\left(\frac{\pi}{2\sqrt{3V_f}}\right)^{\frac{1}{2}} - 1\right]r$$

where $V_f$ is the volume fraction of the fibres with respect to the total volume of the fibres and the resin matrix and r is the radius of the fibres.

12. A method of manufacturing a fibre-reinforced composite material, the method including the steps of:
  (a) providing a prepreg comprising a layer of dry fibres and a layer of resin material adhered to a surface of the layer of dry fibres, the resin material having a plurality of particles dispersed therein, the particles have an average particle size that is larger than the average fibre separation of the layer of dry fibres; and
  (b) flowing the resin into the layer of dry fibres to form a resin matrix around the layer of fibres, the layer of fibres filtering the particles dispersed in the resin to form a heterogeneous dispersion of the particles within the resin matrix.

13. A method according to claim 12 wherein the resin matrix comprises a first region disposed at a surface of the layer of fibres which has a higher concentration of particles than a second region of the resin matrix disposed within the layer of fibres.

14. A method according to claim 13 wherein the first region is a surface region of the resin matrix.

15. A method according to claim 14 wherein at least two prepregs are provided in a stack and the composite material comprises at least two layers of fibres, and the first region is between adjacent fibre layers.

16. A method according to claim 12 wherein step (b) of flowing the resin into the layer of fibres to form a resin matrix around the layer of fibres is carried out in an initial phase of a resin curing process to form a fibre-reinforced composite material.

17. A method of manufacturing a fibre-reinforced composite material, the method including the steps of:
  (a) providing a layer of dry fibres;
  (b) providing a resin having a plurality of particles dispersed therein, wherein the fibres in the layer have an average particle separation and the particles have an average particle size that is larger than the average fibre separation of the layer of fibres;
  (c) forming a layer of the resin on a surface of the layer of fibres; and
  (d) flowing the resin into the layer of fibres to form a resin matrix around the layer of fibres, the layer of fibres filtering the particles dispersed in the resin to form a heterogeneous dispersion of the particles within the resin matrix.

18. A method according to claim 17 wherein the particles comprise fire retardant.

19. A method according to claim 17 wherein the volume fraction of the fibres in the resin matrix is from 40 to 60%.

20. A method according to claim 17 wherein the fibres have a diameter of from 5 to 25 microns and a majority of the particles have a size of from 1 to 10 microns.

\* \* \* \* \*